United States Patent
Dalgoutte

Patent Number: 5,199,099
Date of Patent: Mar. 30, 1993

[54] OPTICAL CABLE SPLICE CASSETTE DEVICE AND METHOD USING SAME

[75] Inventor: David Dalgoutte, Ormskirk, England

[73] Assignee: BICC Public Limited Company, London, England

[21] Appl. No.: 847,335

[22] Filed: Mar. 6, 1992

[30] Foreign Application Priority Data

Mar. 14, 1991 [GB] United Kingdom ............... 9105435

[51] Int. Cl.⁵ .................. G02B 6/40; B65D 1/34
[52] U.S. Cl. .................................. 385/135; 385/14; 385/45; 385/99; 385/114; 385/136; 385/137; 206/316.1; 206/565
[58] Field of Search ................ 385/31, 38, 39, 45, 385/42, 46, 51, 55, 88, 89, 92, 94, 100, 114, 96, 98, 99, 135, 136, 137, 14; 250/227.11; 206/316.1, 557, 565, 563

[56] References Cited

U.S. PATENT DOCUMENTS

| | | | |
|---|---|---|---|
| 4,472,020 | 9/1984 | Evanchuk | 385/14 X |
| 4,544,231 | 10/1985 | Peterson | 385/85 X |
| 4,652,082 | 3/1987 | Warner | 385/83 X |
| 4,725,131 | 2/1988 | Goodwin et al. | 385/27 |
| 4,767,175 | 8/1988 | Böhner et al. | 385/88 X |
| 4,799,229 | 1/1989 | Miyazawa et al. | 372/45 |
| 4,826,275 | 5/1989 | Heinzman | 385/46 X |
| 4,844,571 | 7/1989 | Stanley | 385/45 X |
| 4,847,848 | 7/1989 | Inoue et al. | 385/49 |
| 4,878,728 | 11/1989 | Mannschke | 385/14 X |
| 4,927,224 | 5/1990 | Ortiz, Jr. et al. | 385/31 |
| 4,946,242 | 8/1990 | Tanno et al. | 385/88 |
| 4,952,798 | 8/1990 | Graham et al. | 385/140 X |
| 4,991,927 | 2/1991 | Anstey | 385/114 X |
| 5,031,984 | 7/1991 | Eide et al. | 385/27 |
| 5,067,787 | 11/1991 | Gillham et al. | 385/24 X |
| 5,078,515 | 1/1992 | Soulard et al. | 385/89 |
| 5,109,448 | 4/1992 | Coden et al. | 385/46 |
| 5,138,689 | 8/1992 | Merlo et al. | 385/135 |
| 5,155,785 | 10/1992 | Holland et al. | 385/137 X |
| 5,155,794 | 10/1992 | Nolf et al. | 385/135 |

FOREIGN PATENT DOCUMENTS

| | | | |
|---|---|---|---|
| 0213672 | 3/1987 | European Pat. Off. | 385/55 X |
| 0227114 | 7/1987 | European Pat. Off. | 385/88 X |
| 0411956 | 2/1991 | European Pat. Off. | 385/114 X |
| 2233853 | 1/1974 | Fed. Rep. of Germany | 385/147 |
| 3324161 | 1/1985 | Fed. Rep. of Germany | 385/47 X |
| 3411595 | 11/1985 | Fed. Rep. of Germany | 385/36 X |
| 8716726 | 2/1988 | Fed. Rep. of Germany | 385/135 X |
| 58-151139 | 9/1983 | Japan | 385/46 X |
| 1501415 | 2/1978 | United Kingdom | 385/49 X |
| 2058396 | 4/1981 | United Kingdom | 385/135 X |
| 90/08336 | 7/1990 | World Int. Prop. O. | 385/135 X |
| 91/20007 | 12/1991 | World Int. Prop. O. | 385/32 X |

*Primary Examiner*—Brian Healy
*Attorney, Agent, or Firm*—Oliff & Berridge

[57] ABSTRACT

An optical connection between optical fibres of two optical cables includes a cassette in which is mounted a preformed component having a housing and discrete optical conductors which are so disposed in the housing that opposite end parts of each of the conductors, each of which end parts is formed of a length of optical fibre, protrude from the housing at an acute angle to one another lying in the range 0° to 90° and that at least a part of an optical signal entering any one of the discrete optical conductors along one of its protruding lengths of optical fibre will pass along a discrete optical path and the part of the optical signal will leave the optical conductor along another of its protruding lengths of optical fibre. Optical fibres of the the two optical cables protrude into the cassette, the optical fibres of one optical cable being spliced to protruding lengths of optical fibre of discrete optical conductors of the preformed component and the optical fibres of the other optical cable being spliced to other protruding lengths of optical fibre of the discrete optical conductors. The optical fibre splices are mechanically protected and are detachably mounted in the cassette at positions spaced from the preformed component so that, when required, the distance between the protected optical fibre splices and the preformed component can be reduced.

9 Claims, 2 Drawing Sheets

OPTICAL CABLE SPLICE CASSETTE DEVICE AND METHOD USING SAME

BACKGROUND OF THE INVENTION

This invention relates to joints between optical cables each comprising a multiplicity of optical fibres.

It is the general practice to house protected splices or joints between optical fibres of two optical cables in a plurality of separately formed cassettes or other containers which are assembled together and housed in an overall joint enclosure into which the optical cables are fed, all such containers hereinafter, for convenience, being included in the generic term "cassette". Each cassette usually houses a plurality of protected optical fibre splices or joints and an excess length of each optical fibre of each splice or joint to provide for any necessity to re-splice or re-joint the optical fibres of any splice or joint which develops a fault.

By the expression "protected optical fibre splice or joint" is meant an optical fibre splice or joint which is surrounded by or enclosed within individual means for providing mechanical protection for the splice or joint.

In order to provide for an excess length of each optical fibre of the plurality of protected splices or joints housed within a cassette, it is common practice for a substantial length of optical fibre extending from a protected splice or joint to be coiled within the periphery of the cassette in at least one complete turn before the fibre emerges from the cassette. Furthermore, in order to avoid or limit the extent of optical signal attenuation and optical fibre fatigue that might otherwise be caused by a bend in an optical fibre, it is also common practice to ensure that the radius of the or each bend in the excess length of each optical fibre does not fall below a predetermined minimum value, usually in the order of 30 mm. As a consequence, the size of a cassette is determined, not by the number of protected optical fibre splices or joints which it houses, but by the minimum radius to which any optical fibre can be bent and a substantial proportion of the space within the cassette serves no useful purpose. Moreover, a plurality of such cassettes assembled together occupies a substantial volume with the consequential serious disadvantage that an overall optical cable joint enclosure which is to house one or more than one assembly of such cassettes is unnecessarily large and expensive and would occupy substantial space in a jointing bay or cabinet.

SUMMARY OF THE INVENTION

It is an object of the present invention to provide an improved method of effecting an optical connection between an optical fibre of one optical cable and an optical fibre of another optical cable, which improved method enables of which the volume of an overall optical cable joint enclosure housing a multiplicity of protected optical fibre splices or joints to be substantially reduced as compared with an overall optical cable joint enclosure hitherto used to house a like number of protected optical fibre splices or joints, without eliminating the provision of an excess length of each optical fibre to accommodate for any re-splicing or re-jointing of the optical fibres of a splice or joint that may be required.

The improved method comprises:

(i) mounting in a cassette a preformed component comprising a housing and at least one discrete optical conductor which is so disposed in the housing that opposite end parts of the conductor, each of which end parts consists of at least one optical fibre, protrude from the housing at an acute angle to one another lying in the range 0° to 90° and that at least a part of an optical signal entering said discrete optical conductor along one of its protruding lengths of optical fibre will pass along a discrete optical path and said part of the optical signal will leave said optical conductor along another of its protruding lengths of optical fibre;

(ii) splicing one of the protruding lengths of optical fibre of the optical conductor of said preformed component to one of said two optical fibres to be optically connected and splicing another of said two lengths of optical fibre of said optical conductor to the other of said two optical fibers;

(iii) providing mechanical protection for each optical fibre splice; and (iv) so mounting the protected optical fibre splices in said cassette that the protected optical fibre splices are spaced from said preformed component, at least one of the group consisting of the preformed component and the protected optical fibre splices being so detachably mounted in said cassette that the distance between the protected optical fibre splices and the preformed component can be reduced.

Where a plurality of optical fibres of one optical cable are to be optically connected to a plurality of optical fibres of another optical cable, such as may be the case when the optical fibres of the or each optical cable are components of an optical fibre ribbon, the preformed component employed preferably comprises a housing and a plurality of discrete optical conductors which are so disposed in the housing that opposite end parts of each of said conductors, each of which end parts consist of at least one length of optical fibre, protrude from the housing at an acute angle to one another lying in the range 0° to 90° and that at least a part of an optical signal entering any one of said discrete optical conductors along one of its protruding lengths of optical fibre will pass along a discrete optical path and said part of the optical signal will leave said optical conductor along another of its protruding lengths of optical fibre.

Each optical fibre splice may be provided with individual mechanical protection or, alternatively, two or more optical fibre splices may be provided with mechanical protection common to said splices. Usually the plurality of protected optical fibre splices in the cassette will be arranged side-by-side so that the protruding lengths of optical fibre of the or each optical conductor of the preformed component over at least parts immediately adjacent the protected optical fibre splices are arranged to extend in the same direction and substantially parallel to one another, the protruding lengths of optical fibre providing the excess length of optical fibre available to accommodate any re-splicing or rejointing of any optical fibre splice that may be required.

Although two protected optical fibres splices or joints are required to effect an optical connection between two optical fibres of the optical cables, doubling of the number of protected optical fibre splices or joints required to effect optical connections between optical fibres of two optical cables does not necessitate any increase in the size of the cassette that might otherwise be employed and, in fact, because the protruding lengths of optical fibre of the preformed component provide the excess lengths of fibre available for effecting any re-splicing that may be required, the overall size of a cassette required to house the protected optical fibre splices and preformed component interconnecting the optical fibres of the optical cables can be substantially less than that of the cassette hitherto employed to house the protected optical fibre splices, and the coiled excess lengths of optical fibre protruding therefrom, interconnecting the optical fibres of optical cables of the same construction.

In order to provide for opposite end parts of the or each optical conductor of the preformed component to protrude from the housing of the component at an acute angle to one another lying in the range 0° to 90°, and preferably in substantially the same direction, an intermediate portion of the length of the or each optical conductor disposed in the housing either subtends an angle lying in the range 90° to 180°, preferably an angle of approximately 180°, or has optically interconnected therein and forming a part thereof at least one means for causing at least a part an optical signal entering the optical conductor along one of said protruding lengths of optical fibre to leave the optical conductor along another of said protruding lengths of optical fibre. Where an intermediate portion of the length of the or each optical conductor disposed in the housing subtends an angle lying in the range 90° to 180° and the optical conductor is an optical fibre, then the radius of the bend in the optical fibre will be such that the extent of any attenuation of an optical signal and of any optical fibre fatigue caused by the bend are acceptable; since there is only a single bend in the optical fibre, the radius of the bend can be substantially less than the minimum radius of bends in excess lengths of optical fibres coiled in cassettes hitherto used and can be in the region of 15 mm or even less. By using optical fibre designed to have strong guiding of an optical signal at the operating wavelength and by employing an annealed fibre or a hermetically coated fibre to reduce any fibre fatigue, a bend of very small radius, e.g. 5 mm, may be used. Where means for causing at least a part of an optical signal entering the optical conductor along one of said protruding lengths of optical fibre to leave the optical conductor along another of said protruding lengths of optical fibre is interconnected in said intermediate part of and forms a part of the optical conductor, said means may comprise a reflector or refractor or a passive integrated optical chip. The passive integrated optical chip, or another passive integrated optical chip disposed within the housing and constituting at least part of the or an optical conductor of the preformed component, may be designed to effect any one of a plurality of fibre-optic functions included among which are:

(i) a tree coupler constituting a cascaded series of Y-junctions;
(ii) a star coupler incorporating a mixing region intermediate of a plurality of input points and a plurality of output points;
(iii) a wavelength selector such as a wavelength division multiplexor or a band-pass filter.

This list of functions which the or a passive integrated optical chip of the preformed component can serve is by no means exhaustive.

The housing of the preformed component may be a moulded body of plastics insulating material in which the or each optical conductor, and when present the or each integrated optical chip or other means for causing an optical signal entering the or an optical conductor along one of said protruding lengths of optical fibre to leave the optical conductor along another of said protruding lengths of optical fibre, may be at least partially encapsulated.

The invention further includes an optical connection between optical fibres of two or more optical cables effected by the improved method hereinbefore described.

BRIEF DESCRIPTION OF THE DRAWINGS

The invention is further illustrated by a description, by way of example, of two preformed components suitable for use in effecting an optical connection between optical fibres of two optical cables and of two cassettes in which a preformed component and a plurality of protected optical fibre splices are disposed, with reference to the accompanying diagrammatic drawings, in which.

DESCRIPTION OF PREFERRED EMBODIMENTS

Figure 1:
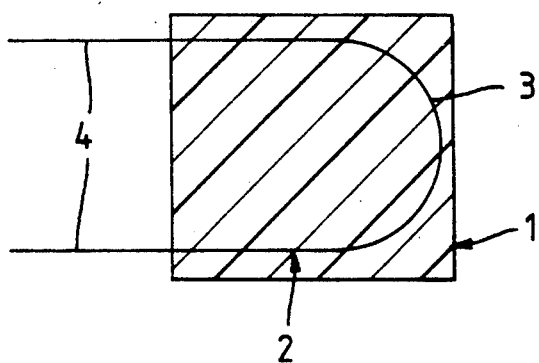
FIGS. 1 and 2 are diagrammatic cross-sectional views of the two preformed components.

The first preformed component shown in FIG. 1 comprises a moulded body 1 of plastics insulating material in which is encapsulated a plurality of optical conductors 2 disposed one above or below and spaced from another, of which only one optical conductor is shown. Each optical conductor 2 comprises a length of hermetically coated optical fibre which, over an intermediate part 3 of its length encapsulated in the moulded body 1 subtends an angle of approximately 180° with a bend in said intermediate length of fibre of a radius of approximately 5 mm, and which has opposite end parts 4 that protrude from the moulded body 1 in substantially the same direction. The protruding end parts 4 of the optical conductor each has a length of several centimeters, e.g. 20 cm, and constitutes excess length of optical fibre available to accommodate any resplicing or re-jointing of an optical fibre splice or joint of which a protruding end part of the optical conductor forms a part.

Figure 2:
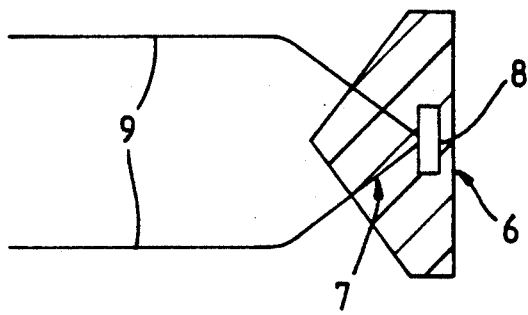

The second preformed component shown in FIG. 2 comprises a moulded body 6 of plastics insulating material in which is encapsulated a plurality of optical conductors 7 disposed one above or below and spaced from another, of which only one optical conductor is shown. Each optical conductor 7 has an integrated passive optical chip 8 optically interconnected in and forming a part of the conductor, which optical chip is wholly encapsulated in the moulded body 6. Opposite end parts 9 of the optical conductor 7 each consist of a length of optical fibre and protrude from the moulded body 6 at an acute angle to one another of approximately 70°. Over a part of the length of each protruding end part 9 of the optical conductor 7 intermediate of its free end and the moulded body 6, the protruding end part can be smoothly bent as shown so that portions of the protruding end parts remote from the moulded body extend substantially parallel to one another. As in the case of the first preformed component shown in FIG. 1, a protruding end part 9 of each optical conductor 6 each has a length of several centimeters, e.g. 20 cm, and constitutes excess length of optical fibre available to accommodate any re-splicing or re-jointing of an optical fibre splice or joint of which a protruding end part of the optical conductor forms a part.

Figure 3:
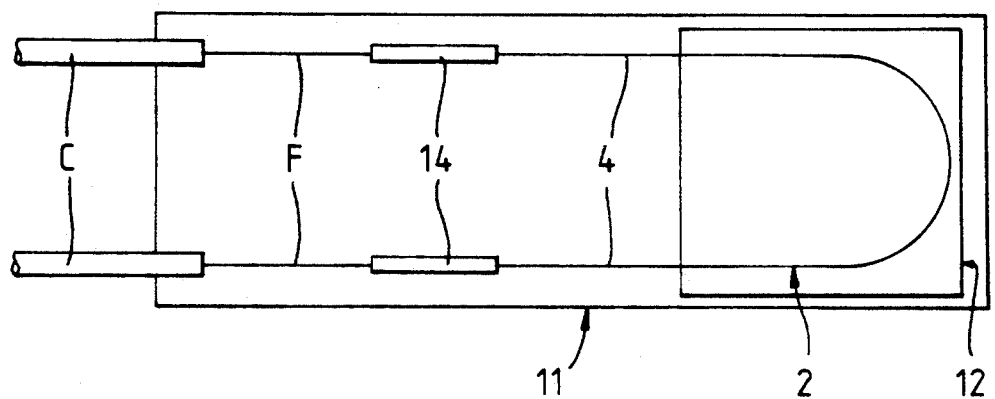
FIGS. 3 and 4 are diagrammatic cross-sectional views of the two preferred cassettes.

As will be seen on referring to FIG. 3, the cutback ends of two optical cables C whose optical fibres are to be optically interconnected protrude into a cassette 11 of rectangular shape through cable entries in one of its ends. A preformed component 12 as described with reference to FIG. 1 is detachably mounted in the cassette 11 adjacent the end of the cassette remote from the optical cables C and one protruding part 4 of each optical conductor 2 of the preformed component is spliced to an optical fibre F of one of the optical cables and the other protruding part of said optical conductor is spliced to an optical fibre F of the other of the optical cables as generally indicated at 14, each optical fibre splice being provided with individual mechanical protection. The mechanically protected optical fibre splices 14 associated with the protruding parts 4 of each optical conductor 2 are each detachably mounted in the cassette. The preformed component 12 and the mechanically protected optical fibre splices 14 are so detachably mounted in the cassette 11 that the distance between the protected optical fibre splices and the preformed component can be reduced to accommodate for any re-splicing of any splice that may be required.

Figure 4:
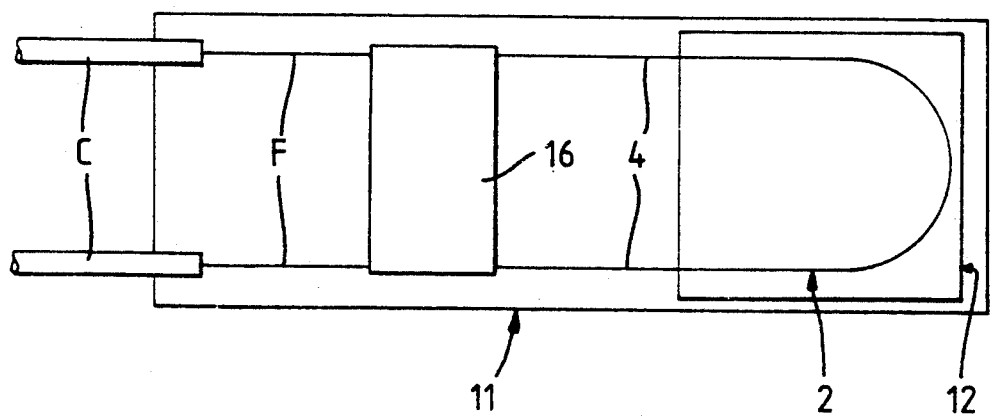

The second preferred cassette shown in FIG. 4 is substantially identical to the first preferred cassette described with reference to FIG. 3 with the exception that the optical fibre splices associated with the protruding parts 4 of each optical conductor 2 of the preformed component 12 are provided with mechanical protection 16 common to the splices. The protected optical fibre splices 16 and the preformed component 12 are detachably mounted in the cassette 11 so that the distance between the protected optical fibre splices and the preformed component can be reduced to accommodate for re-splicing of any splice that may be required.

It will be appreciated that in each of the cassettes shown in FIGS. 3 and 4, protruding parts 4 of each optical conductor 2 of the preformed component 12, and a plurality of protected optical fibre splices 14 or 16, are disposed one above or below and spaced from another.

What I claim as my invention is:

1. A method of effecting an optical connection between an optical fibre of one optical cable and an optical fibre of another optical cable, which method comprises:
   (i) mounting in a cassette a preformed component comprising a housing and at least one discrete optical conductor which is so disposed in the housing that opposite end parts of the conductor, each of which end parts consists of at least one length of optical fibre, protrude from the housing at an acute angle to one another lying in the range 0° to 90° and that at least a part of an optical signal entering said discrete optical conductor along one of its protruding lengths of optical fibre will pass along a discrete optical path and said part of the optical signal will leave said optical conductor along another of its protruding lengths of optical fibre;
   (ii) splicing one of the protruding lengths of optical fibre of the optical conductor of said preformed component to one of said two optical fibres to be optically connected and splicing another of said protruding lengths of optical fibre of said optical conductor to the other of said two optical fibres;
   (iii) providing mechanical protection for each optical fibre splice; and
   (iv) so mounting the protected optical fibre splices in said cassette that the protected optical fibre splices are spaced from said preformed component, at least one of the group consisting of the preformed component and the protected optical fibre splices being so detachably mounted in said cassette that the distance between the protected optical fibre splices and the preformed component can be reduced.

2. A method of effecting an optical connection between optical fibres of one optical cable and optical fibres of another optical cable, which method comprises:
   (i) mounting in a cassette a preformed component comprising a housing and a plurality of discrete optical conductors which are so disposed in the housing that opposite end parts of each of said conductors, each of which end parts consists of at least one length of optical fibre, protrude from the housing at an acute angle to one another lying in the range 0° to 90° and that at least a part of an optical signal entering any one of said discrete optical conductors along one of its protruding lengths of optical fibre will pass along a discrete optical path and said part of the optical signal will leave said optical conductor along another of its protruding lengths of optical fibre;
   (ii) splicing one of the protruding lengths of optical fibre of each of at least some of said discrete optical conductors of said preformed component to one of two optical fibres to be optically connected and splicing another of said protruding lengths of optical fibre of said discrete optical conductor to the other of said two optical fibres;
   (iii) providing mechanical protection for each optical fibre splice; and
   (iv) so mounting the protected optical fibre splices in said cassette that the protected optical fibre splices are spaced from said preformed component, at least one of the group consisting of the preformed component and the protected optical fibre splices being so detachably mounted in said cassette that the distance between the protected optical fibre splices and the preformed component can be reduced.

3. A method as claimed in claim 2, wherein the plurality of protected optical fibre splices are disposed side by side in the cassette and the protruding lengths of optical fibre of each discrete optical conductor of the preformed component over at least parts immediately adjacent the protected optical splices are arranged to extend in the same direction and substantially parallel to one another.

4. A method as claimed in claim 2, wherein the optical fibres of at least one of said optical cables are components of an optical fibre ribbon.

5. A method as claimed in claim 2, wherein the optical fibre splices are provided with mechanical protection common to said splices.

6. An optical connection between an optical fibre of one optical cable and an optical fiber of another optical cable, which optical connection comprises a cassette in which is mounted a preformed component comprising a housing and at least one discrete optical conductor which is so disposed in the housing that opposite end parts of the conductor, each of which end parts consists of at least one length of optical fibre, protrude from the housing at an acute angle to one another lying in the range 0° to 90° and that at least a part of an optical signal entering said discrete optical conductor along one of its protruding ends of optical fibre will pass along a discrete optical path and said part of the optical signal will leave said optical conductor along another of its protruding lengths of optical fibre and into which cassette protrude an optical fibre of each of said optical cables, and optical fibre of one optical cable being spliced to one protruding length of optical fibre of the discrete optical conductor of said preformed component and the optical fibre of said other optical cable being spliced to another protruding length of optical fibre of said discrete optical conductor, which optical fibre splices are mechanically protected and are mounted in said cassette at positions spaced from said preformed component, at least one of the group consisting of the preformed component and the mechanically protected optical fibre splices being so detachably mounted in said cassette that the distance between the protected optical fibre splices and the preformed component can be reduced.

7. An optical connection between optical fibres of one optical cable and optical fibres of another optical cable, which optical connection comprises a cassette in which is mounted a preformed component comprising a housing and a plurality of discrete optical conductors which are so disposed in the housing that opposite end parts of each of said conductors, each of which end parts consists of at least one length of optical fibre, protrude from the housing at an acute angle to one another lying in the range 0° to 90° and that at least a part of an optical signal entering any of one of said discrete optical conductors along one of its protruding lengths of optical fibre will pass along a discrete optical path and said part of the optical signal will leave said optical conductor along another of its protruding lengths of optical fibre and into which cassette protrude at least two optical fibres of each of said optical cables, the optical fibres of one optical cable being spliced to protruding lengths of optical fibre of discrete optical conductors of said preformed component and the optical fibres of said other optical cable being spliced to other protruding lengths of optical fibre of said discrete optical conductors, which optical fibre splices are mechanically protected and are mounted in said cassette at positions spaced from said preformed component, at least one of the group consisting of the preformed component and the mechanically protected optical fibre splices being so detachably mounted in said cassette that the distance between the protected optical fibre splices and the preformed component can be reduced.

8. An optical connection between an optical fibre of one optical cable and an optical fibre of another optical cable as claimed in claim 6, wherein the discrete optical conductor of the preformed component has an intermediate part which is disposed in the housing of the preformed component and which has a passive integrated optical chip interconnected therein and forming a part thereof, which chip is designed to effect a fibre-optic function.

9. An optical connection between an optical fibre of one optical cable and an optical fibre of another optical cable as claimed in claim 8, wherein the housing of the preformed component is a molded body of plastics insulating material in which the passive integrated optical chip is encapsulated.

* * * * *